United States Patent
Kim et al.

(10) Patent No.: US 10,776,151 B2
(45) Date of Patent: *Sep. 15, 2020

(54) ADAPTIVE CPU NUMA SCHEDULING

(71) Applicant: VMware, Inc., Palo Alto, CA (US)

(72) Inventors: Seongbeom Kim, Sunnyvale, CA (US); Haoqiang Zheng, Cupertino, CA (US); Rajesh Venkatasubramanian, San Jose, CA (US); Puneet Zaroo, Santa Clara, CA (US)

(73) Assignee: VMWARE, INC., Palo Alto, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/292,502

(22) Filed: Mar. 5, 2019

(65) Prior Publication Data
US 2019/0205155 A1   Jul. 4, 2019

Related U.S. Application Data

(63) Continuation of application No. 14/492,051, filed on Sep. 21, 2014, now Pat. No. 10,255,091.

(51) Int. Cl.
*G06F 9/455*  (2018.01)
*G06F 9/48*   (2006.01)
*G06F 9/50*   (2006.01)

(52) U.S. Cl.
CPC ...... *G06F 9/45558* (2013.01); *G06F 9/45554* (2013.01); *G06F 9/48* (2013.01); *G06F 9/5033* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| | | |
|---|---|---|
| 6,105,053 A | 8/2000 | Kimmel et al. |
| 6,769,017 B1 | 7/2004 | Bhat et al. |
| 8,443,376 B2 | 5/2013 | Bhandari et al. |
| 2004/0019891 A1 | 1/2004 | Koenen |
| 2007/0113019 A1 | 5/2007 | Beukema et al. |
| 2007/0156964 A1 | 7/2007 | Sistla |
| 2007/0220195 A1 | 9/2007 | Kawaguchi |
| 2009/0187915 A1 | 7/2009 | Chew et al. |

(Continued)

OTHER PUBLICATIONS

Hewlett-Packard Company, "ACPI System Locality Information Table Interface", Version 0.9, Available at: «http://h21007.www2.hp.com/portal/download/files/unprol/ltanium/slil.pdf», Jun. 26, 2000, 4 pages.

*Primary Examiner* — Shih-Wei Kraft
(74) *Attorney, Agent, or Firm* — Thomas | Horstemeyer, LLP

(57) ABSTRACT

Systems and methods for performing selection of non-uniform memory access (NUMA) nodes for mapping of virtual central processing unit (vCPU) operations to physical processors are provided. A CPU scheduler evaluates the latency between various candidate processors and the memory associated with the vCPU, and the size of the working set of the associated memory, and the vCPU scheduler selects an optimal processor for execution of a vCPU based on the expected memory access latency and the characteristics of the vCPU and the processors. The systems and methods further provide for monitoring system characteristics and rescheduling the vCPUs when other placements provide improved performance and efficiency.

20 Claims, 8 Drawing Sheets

(56) References Cited

U.S. PATENT DOCUMENTS

| | | |
|---|---|---|
| 2011/0055479 A1 | 3/2011 | West et al. |
| 2011/0161976 A1 | 6/2011 | Alexander et al. |
| 2012/0072627 A1 | 3/2012 | Droux et al. |
| 2012/0174117 A1 | 7/2012 | Jula et al. |
| 2013/0246715 A1 | 9/2013 | Miyauchi |

ADAPTIVE CPU NUMA SCHEDULING

CROSS-REFERENCE TO RELATED APPLICATIONS

This application is a continuation of and claims the benefit of U.S. patent application Ser. No. 14/492,051, filed Sep. 21, 2014 and entitled "Adaptive CPU NUMA Scheduling," which is incorporated entirely herein by reference.

BACKGROUND

For some virtual machines (VMs), virtual central processing units (vCPUs) and their associated memory are executed on non-uniform memory access (NUMA) systems. NUMA systems have multiple memory proximity domains, referred to as NUMA nodes, each of which is a group of CPU cores and memory. In some examples, a CPU package sits in a "socket" and maps to a plurality of NUMA nodes. The entire configuration is, in that example, referred to as a processor. NUMA nodes result in a variance of memory access latencies, unlike uniform memory access (UMA) systems. Examples of NUMA architectures include OPTERON by AMD Systems, Inc. and NAHALEM by Intel Corp. Access by a processor to memory within the same NUMA node is considered local access, and is usually much faster than access to the memory belonging to the other NUMA nodes, which is considered remote access.

Placing vCPUs on NUMA nodes remote from the associated memory of the vCPU increases memory access latency, and degrades overall application performance. Consequently, the CPU schedulers of some existing systems, operating under a "hard" NUMA policy, assign both the vCPU and the associated memory of the vCPU to a single NUMA node referred to as the NUMA "home" node. This approach ensures reduced local memory access latency, but it frequently suffers from high CPU contention on some NUMA nodes and fails to achieve optimal CPU utilization on other nodes. For example, if CPU contention is high on the home node while the contention is lower on remote nodes, the hard NUMA policy fails to utilize otherwise unused CPUs in remote NUMA nodes.

Under existing NUMA migration policies, the NUMA scheduler assigns new home nodes—where CPU contention is lower—to a process or a group of processes. While this addresses the long-term CPU imbalance, reassigning home nodes cannot happen frequently enough to address short-term CPU imbalances at least because the NUMA scheduler has to consider memory load balancing as well. Therefore, a hard NUMA policy combined with NUMA migration still suffers from suboptimal CPU utilization.

For optimal memory locality, a single home node is associated with multiple vCPUs belonging to a VM. Under a hard NUMA policy, assigning a home node to VMs becomes a bin-packing problem where VMs of various sizes need to be placed in fixed size bins (e.g., NUMA nodes). As the size of VMs gets bigger, some bins may have holes that cannot be filled with existing VMs. For example, on a system with two NUMA nodes each of which has six cores, 12 vCPUs should run without CPU contention. If there are three 4-vCPU VMs, the hard NUMA policy places two 4-vCPU VMs on the same node while the other node has only one 4-vCPU VM. This placement results in one node being over-utilized while the other node is being underutilized.

SUMMARY

One or more examples described herein evaluate and select, from among a plurality of physical processors, located on a plurality of non-uniform memory access (NUMA) nodes, the optimal processor on which to execute the virtual processes, or vCPUs, of a VM. The evaluation is based upon, for example, the expected memory access latency within and/or between various NUMA nodes, upon a page occupancy of the memory associated with the NUMA nodes, and/or the CPU costs of executing on a NUMA node.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Examples described herein disclose architectures and methods for scheduling a plurality of virtual processes onto physical processors. The processes, or virtual central processing units (vCPUs), of virtual machines (VMs) are scheduled to be executed on physical processors. In some examples, a vCPU and the memory associated with that vCPU are co-located to minimize any latency that the vCPU may experience when accessing the associated memory. This scheduling is done by assigning, defining, grouping, or otherwise associating the vCPUs of a VM to one or more NUMA clients. The NUMA clients are then assigned a physical NUMA node upon which to execute.

The methods disclosed in the present disclosure provide flexibility in scheduling vCPUs to CPUs. For example, the vCPUs need not be co-located on the same NUMA node as the associated memory. While this may increase memory access latency, the CPU scheduler as described herein evaluates whether the latency cost in this arrangement is offset by the increased processing capabilities achieved by relocating the vCPU, and selects a NUMA node accordingly. Aspects of the disclosure increase processing capabilities, streamline CPU scheduling, and maximize use of all available resources.

One or more vCPUs of a VM may be assigned to one or more NUMA clients, and a given NUMA client may be assigned to only one NUMA node, in some examples. Consequently, while a VM may span several NUMA nodes on multiple NUMA clients, a given NUMA client may be placed on a single NUMA node, in some examples. While the disclosure refers to placing or assigning a vCPU onto a processor, it is understood that the NUMA client, in some examples, exists as a layer between the vCPU and the processor.

The example method of vCPU scheduling through a CPU scheduler executing on a host computing device improves the functionality of VMs. For example, the CPU scheduler considers high CPU contention on some NUMA nodes and CPU underutilization on other NUMA nodes, which may exist under hard NUMA policies, when scheduling. vCPUs mapped to CPUs under the present disclosure operate more quickly with lower overall processing times, thereby improving the functioning of the host computing device itself.

Further, aspects of the disclosure operate to increase the speed of operation of VMs, conserve memory, reduce processor load, reduce network bandwidth usage, and/or improve operating system resource allocation.

Figure 1:
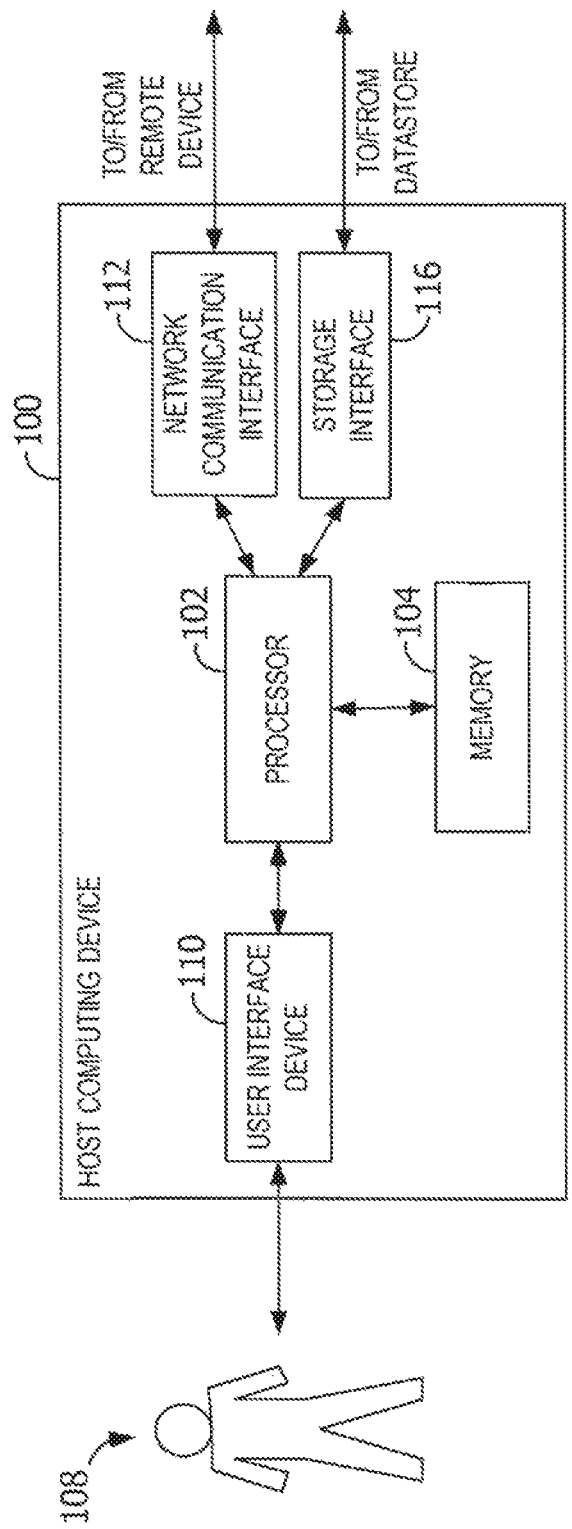
FIG. 1 is a block diagram of an exemplary host computing device.

FIG. 1 is a block diagram of an exemplary host computing device 100. Host computing device 100 includes a processor 102 for executing instructions. In some examples, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid state disks, and/or optical disks. In FIG. 1, memory 104 refers to memory and/or storage. However, in some examples, memory 104 may refer only to memory in host computing device 100, and exclude storage units such as disk drives and hard drives. Other definitions of memory are contemplated.

Host computing device 100 may include a user interface device 110 for receiving data from a user 108 and/or for presenting data to user 108. User 108 may interact indirectly with host computing device 100 via another computing device such as VMware's VCENTER SERVER or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 110 operates to receive data from user 108, while another device (e.g., a presentation device) operates to present data to user 108. In other examples, user interface device 110 has a single component, such as a touch screen, that functions to both output data to user 108 and receive data from user 108. In such examples, user interface device 110 operates as a presentation device for presenting information to user 108. In such examples, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some examples, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In some examples, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
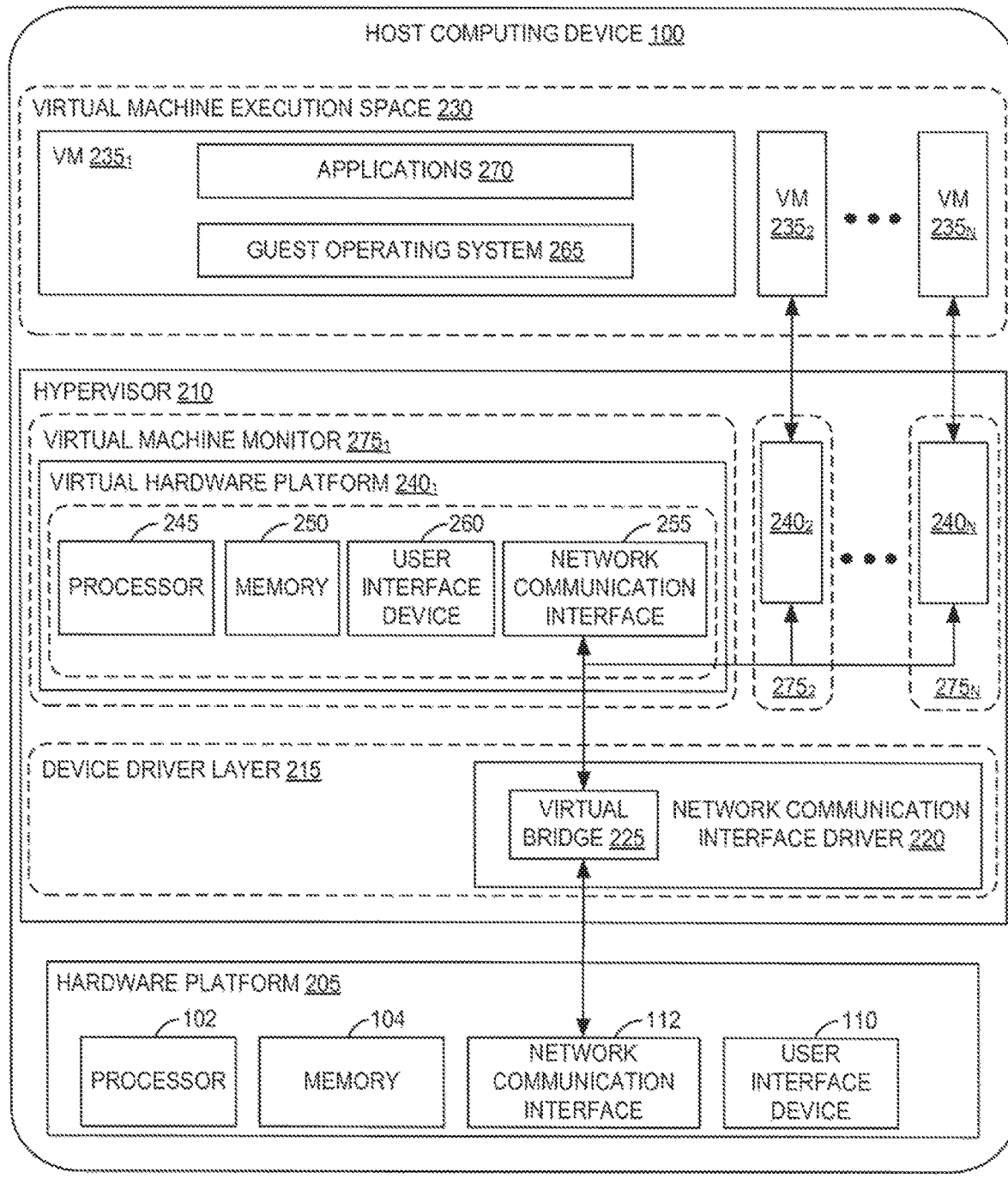
FIG. 2 is a block diagram of virtual machines that are instantiated on a computing device, such as the host computing device shown in FIG. 1.

FIG. 2 depicts a block diagram of virtual machines $235_1$, $235_2$ ... $235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device. A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some examples, memory 250 in first virtual hardware platform 240₁ includes a virtual disk that is associated with or "mapped to" one or more virtual disk images stored on a disk (e.g., a hard disk or solid state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an example, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform 2401 may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Aspects of the disclosure are operable with any computer architecture, including non-x86-compatible processor structures such as those from Acorn RISC (reduced instruction set computing) Machines (ARM), and operating systems other than those identified herein as examples.

Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an example of the disclosure is included as a component in VMware's ESX brand software, which is commercially available from VMware, Inc.

Figure 3:
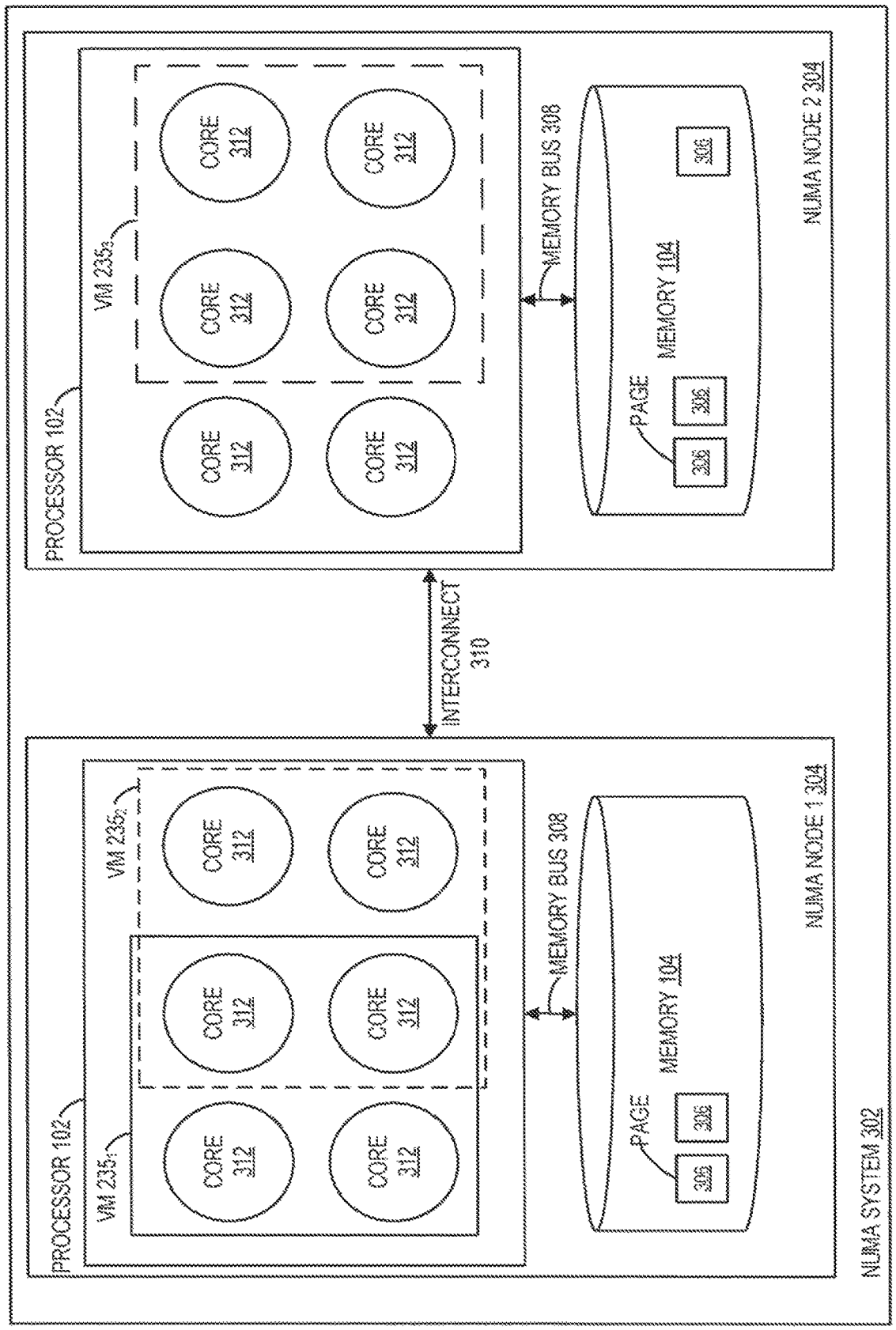
FIG. 3 is a block diagram of an exemplary traditional non-uniform memory access (NUMA) system under a "hard" NUMA policy.

FIG. 3 is a block diagram of an exemplary non-uniform memory access (NUMA) system 302 under a "hard" NUMA policy. In FIG. 3, a NUMA system 302 under a hard NUMA policy is composed of a plurality of NUMA nodes 304. It is understood that although FIG. 3 shows a specific arrangement, any other arrangement of cores 312, processors 102, memory 104, etc. is contemplated. For instance, although FIG. 3 has two NUMA nodes 304, a NUMA system 302 may have more than two NUMA nodes 304, and these arrangements are merely exemplary.

Figure 4:
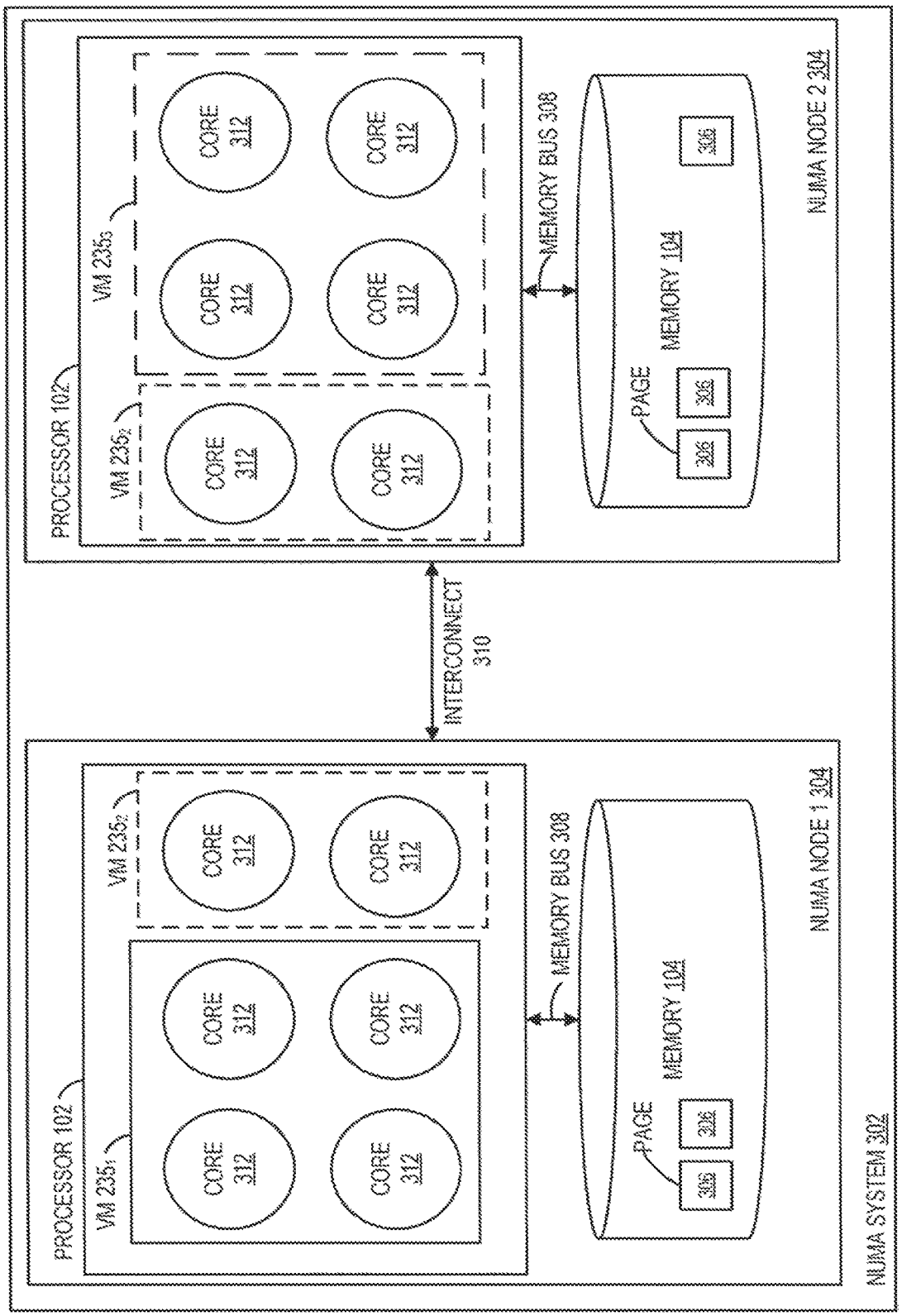
FIG. 4 is a block diagram of an exemplary NUMA system under a "soft" NUMA policy, such as disclosed in the present application.

A plurality of cores 312 is within each NUMA node 304. The cores 312, along with features such as shared last level cache, make up the processor 102 on the NUMA node 304. The cores illustrated in both FIG. 3 and FIG. 4 are, in one example, within the host computing device 100. The cores 312 on a specific NUMA node 304 share access to local memory 104 on that NUMA node 304. The processor 102 and its associated memory 104 communicate through the memory bus 308. The memory 104 is populated by a plurality of pages 306 associated with vCPUs running on the cores 312. In some examples, individual processors 102 or cores 312 on one NUMA node 304 do not have direct access to the memory 104, cores 312, or processors 102 of any other NUMA node 304. In these examples, remote NUMA nodes 304 may be accessed by a process, such as a vCPU, on a different NUMA node 304 through an interconnect 310 between the two NUMA nodes 304. The interconnect 310 includes any means supporting data transmission between the NUMA nodes 304.

The vCPUs, executed by VMs 235, are mapped to the physical processors 102 of the NUMA nodes 304. FIG. 3 illustrates the mapping of three VMs 235—VM1 $235_1$, VM2 $235_2$, and VM3 $235_3$—to the NUMA nodes 304 under a hard NUMA policy. VM1 235 is represented by a solid box around four cores 312 on the NUMA node 304 on the left, herein NUMA node 1 304. VM2 235 is represented by a short-dashed box around four cores 312 on NUMA node 1 304. VM3 235 is represented by a long-dashed box around four cores 312 on the NUMA node of the right of FIG. 3, herein NUMA node 2 304. Under the hard NUMA policy pictured in FIG. 3, VMs 235 are not fragmented between different processors on different NUMA nodes 304, even though there are idle cores 312 on a remote NUMA node 304. Further, the vCPU of a VM 235 is always placed on the same NUMA node 304 as its associated memory 104 in this example. The NUMA node 304 which hosts the vCPU and the memory 104 of a VM 235 is referred to as the home NUMA node 304.

As FIG. 3 illustrates, in this example of hard NUMA policy, if there are three VMs 235 which require four cores 312 each to host their respective vCPUs, the CPU scheduler assigns VM1 235 and VM2 235 to share six cores 312 on the processor 102 of NUMA node 1 304, while the CPU scheduler assigns VM3 235 to utilize the four cores 312 on NUMA node 2 304. This division causes high CPU contention on NUMA node 1 304, as VM1 235 and VM2 235 share two of the six cores 312 on NUMA node 1 304. In turn, there are two idle cores 312 on NUMA node 2 304 under the existing hard NUMA policy.

Under the hard NUMA policy illustrated in FIG. 3, the CPU scheduler may only schedule a process within its home NUMA node 304. This results in optimal memory locality. However, as a result the system as a whole may suffer from high CPU contention and suboptimal CPU utilization. The example of FIG. 3 illustrates this as VM1 235 and VM2 235 share two cores 312 on NUMA node 1 304, while two cores 312 on NUMA node 2 304 are unused. In the absence of perfectly sized vCPUs, the hard NUMA policy fails to permit vCPUs to utilize otherwise unused cores 312 on remote NUMA nodes 304.

FIG. 4 is a block diagram of an exemplary NUMA system 302 under the "soft" NUMA policy disclosed in the present application. In FIG. 4, a NUMA system 302 of the present disclosure is composed of a plurality of NUMA nodes 304.

Within each NUMA node 304 is a plurality of cores 312. It is understood that although FIG. 4 shows a specific arrangement, any other arrangement of cores 312, processors 102, memory 104, etc. is contemplated. For instance, although FIG. 4 has six cores 312 per processor 102, a processor 102 may have any number of cores 312, and these arrangements are merely exemplary. The cores 312, along with features such as a shared last level cache, make up the processor on the NUMA node 304. The cores 312 on a specific NUMA node 304 share access to local memory 104 on that NUMA node 304 by way of a memory bus 308. The memory 104 is populated by a plurality of pages 306. In some examples, individual processors 102 or cores 312 on one NUMA node 304 do not have direct access to the memory 104, cores 312, or processors 102 of any other NUMA node 304. In these examples, remote NUMA nodes 304 may be accessed by a process 102, such as a vCPU, on a different NUMA node 304 through an interconnect 310 between the two NUMA nodes 304. The interconnect 310 includes any means supporting data transmission between the NUMA nodes 304.

The vCPUs, running on VMs 235, are mapped to the physical processors 102 of the NUMA nodes 304 in accordance with the soft NUMA policy in the present disclosure. FIG. 4 illustrates the mapping of the same three VMs 235 from FIG. 3 (e.g., VM1, VM2, and VM3). In FIG. 4, VM1 235 is represented by a solid box around four cores 312 on the NUMA node 1 304. VM2 235 is represented by a short-dashed box around two cores 312 on NUMA node 1 304, and two cores on NUMA node 2. Unlike in FIG. 3, VM2 235 is split between NUMA node 1 304 and NUMA node 2 304 in FIG. 4. VM3 235 is represented by a long-dashed box around four cores 312 on NUMA node 2 304.

Under the example of soft NUMA policy described herein and pictured in FIG. 4, VM2 235 is fragmented between different processors 102 on different NUMA nodes 304. As FIG. 4 illustrates, if there are three VMs 235 which require four cores 312 each to host their respective vCPUs, but only two processors 102 with six cores 312 each, the CPU scheduler assigns VM1 235 and part of VM2 235 to share six cores 312 on the processor 102 of NUMA node 1 304, while the CPU scheduler assigns the remainder of VM2 235 and VM3 235 to utilize all six cores 312 on NUMA node 2 304. This division relieves the high CPU contention on NUMA node 1 304 which was illustrated in FIG. 3, as VM2 235 is shared between NUMA node 1 304 and NUMA node 2 304.

Figure 5:
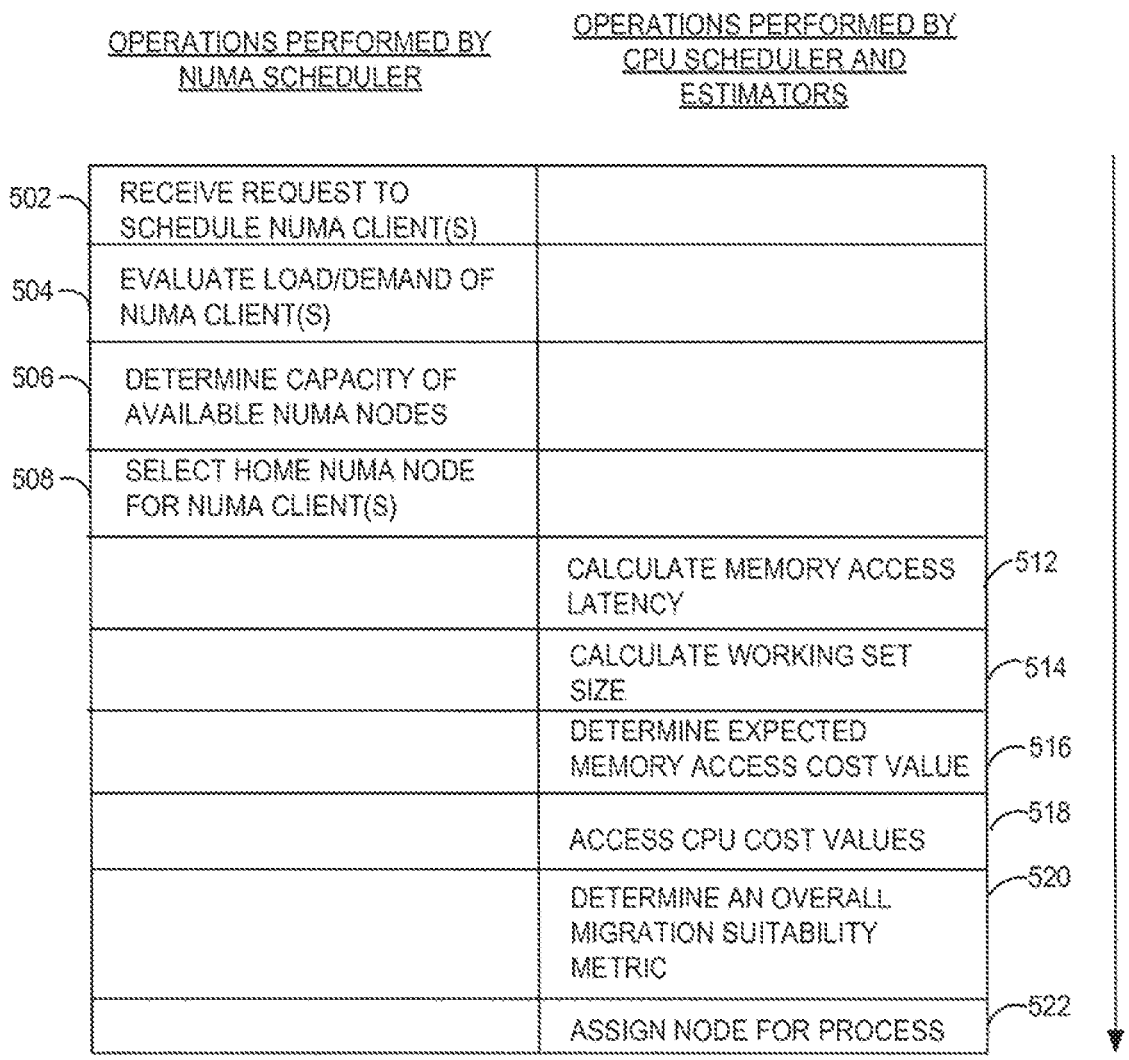
FIG. 5 is a block diagram of an exemplary sequence of actions performed by the NUMA scheduler and the CPU scheduler.

FIG. 5 is an exemplary sequence diagram illustrating the sequence of steps performed by the NUMA scheduler and the CPU scheduler. At 502, the NUMA scheduler receives one or more NUMA clients for scheduling. A VM 235, depending on the number of vCPUs it is executing, may be assigned to one or more NUMA clients. After receiving the NUMA clients for assignment, the NUMA scheduler evaluates the CPU and memory load and demands of the NUMA clients 504. NUMA scheduler selects a NUMA node 304 with the most CPU contention and a NUMA node 304 with the least CPU contention. If the CPU load imbalance is great enough between the two NUMA nodes 304, the NUMA scheduler changes the home NUMA nodes 304 of a few VMs 235. If it will not cause CPU contention, the NUMA scheduler may change home NUMA nodes 304 to improve memory locality.

In some examples, at 506 the NUMA scheduler evaluates the NUMA nodes 304 available for scheduling. This evaluation includes, for example, the free memory on the NUMA nodes 304, the processing capabilities of the NUMA nodes 304, and any anticipated changes to either the architecture or load of that NUMA node 304. Based on the CPU (e.g., processor 102) and memory 104 load/demand of the NUMA client, and based on the capacity of available NUMA nodes 304, the NUMA scheduler selects a home NUMA node 304 for the NUMA client, at 508. In some examples, a NUMA client is confined to a single NUMA node 304, whereas a single VM 235 may span multiple NUMA clients, housed on different NUMA nodes 304. Thus, a VM 235 may be divided between several NUMA nodes 304, but the portion of each VM 235 assigned to any given NUMA client will be on a single home NUMA node 304. In other examples, as illustrated in FIG. 4, VM2 235 is divided between NUMA node 1 304 and NUMA node 2 304; however, VM2 235 is confined to one NUMA client over two NUMA nodes 304. In that example, all of VM2 235 is on the same NUMA client (not illustrated), but two vCPUs of VM2 235 are on NUMA node 1 235, and the other vCPUs of VM2 235 are on NUMA node 2 304. Although VM2 235 is divided between multiple NUMA nodes 235, it is still assigned to a home NUMA node 304.

After assigning all NUMA clients to a home NUMA node 304, the NUMA scheduler determines a remaining capacity of available NUMA nodes 304. For example, the NUMA scheduler may perform this determination at any time subsequent to assigning the home NUMA nodes 304, and may re-perform the determination periodically, intermittently regularly, etc. The processing capacity and the memory capacity of a NUMA node 304 are evaluated as separate quantities, in some examples. Alternatively or in addition, during initial placement, the capacity of the NUMA node 304 is calculated as a function of the remaining processing capacity and memory capacity. In an example where the capacity of the NUMA node is reduced to one value, the processing capacity or memory capacity may be weighted in accordance with values defined by a user, by the NUMA scheduler, or by the VM, for example.

After the NUMA scheduler has assigned home NUMA nodes 304 to all NUMA clients at 508 the CPU scheduler evaluates remote candidate NUMA nodes 304 for vCPU migration. Alternatively or in addition, while the sequence diagram illustrates the processes as sequential, after the first NUMA client is assigned its home NUMA node 304 by the NUMA scheduler, the CPU scheduler may begin optimizing the vCPU placements for the vCPUs assigned to that NUMA client. It is understood that the NUMA scheduler may operate continuously to place new VMs 235 and their associated NUMA clients, or as older VMs 235 cease operations. In some examples, at least one NUMA client is assigned a home NUMA node 304 by the NUMA scheduler before the CPU scheduler evaluates alternative remote candidate NUMA nodes 304. Aspects of the disclosure contemplate the NUMA scheduler operating continuously, periodically, intermittently, regularly, or as needed during operation of the CPU scheduler.

The processes performed by the CPU scheduler and the estimators (e.g., memory cost estimator and CPU cost estimator) are illustrated at 512 through 522. At 512, the memory access latency is measured at boot time by running a loop that accesses memory 104 on different NUMA nodes 304, or the memory access latency is read from a SLIT by the memory cost estimator. The memory cost estimator determines intra-node and inter-node memory access latencies for any candidate NUMA node 304. At 514, the memory cost estimator calculates the working set size of the memory 104 associated with the vCPU under review. The working set size indicates the location and amount of memory 104 associated with the vCPU. In some examples, the vCPU is co-located on the same NUMA node 304 as all of its memory 104. However, in other examples memory 104 associated with the vCPU is located on a plurality of NUMA nodes 304. It is understood that while operations 512 and 514 are illustrated in order, operation 514 may precede operation 512. However, both the memory access latencies and the working set size are determined before 516. At 516, the memory cost estimator utilizes the inter-node and intra-node latency, and the per-node working set size to determine the memory access cost value of each NUMA node 304 (e.g., see Equation (2) below). At 518, the CPU scheduler accesses the CPU cost value from the CPU cost estimator. The CPU cost value correlates, in some examples, to the CPU contention. The CPU scheduler evaluates the CPU cost value and the memory access cost value to determine an overall migration suitability metric at 520. The overall migration suitability metric represents, in some examples, an overall memory access cost, or otherwise indicates how good the proposed migration is for this VM. The overall migration suitability metric reflects CPU contention over the NUMA system 302, location and size of memory 104 associated with the vCPU under evaluation, and the memory access latencies between NUMA nodes 304. The calculation of the overall migration suitability metric, in some examples, relies on weighting the factors (e.g., CPU cost value, or inter-node latency) differently. As an example, a vCPU which infrequently accesses its memory 104 may weight CPU cost value more than the memory access cost value. At 522, the CPU scheduler selects an appropriate NUMA node 304 from among the candidate NUMA nodes 304. The CPU scheduler assigns that NUMA node 304 to the vCPU process under review. The sequence illustrated in FIG. 5 is ongoing, in some examples. For example, the sequence repeats as new NUMA clients are assigned to the system. The sequence also repeats, in some examples, if there are changes in topography, VMs 235 terminate, or the factors are weighted differently.

Figure 6A:
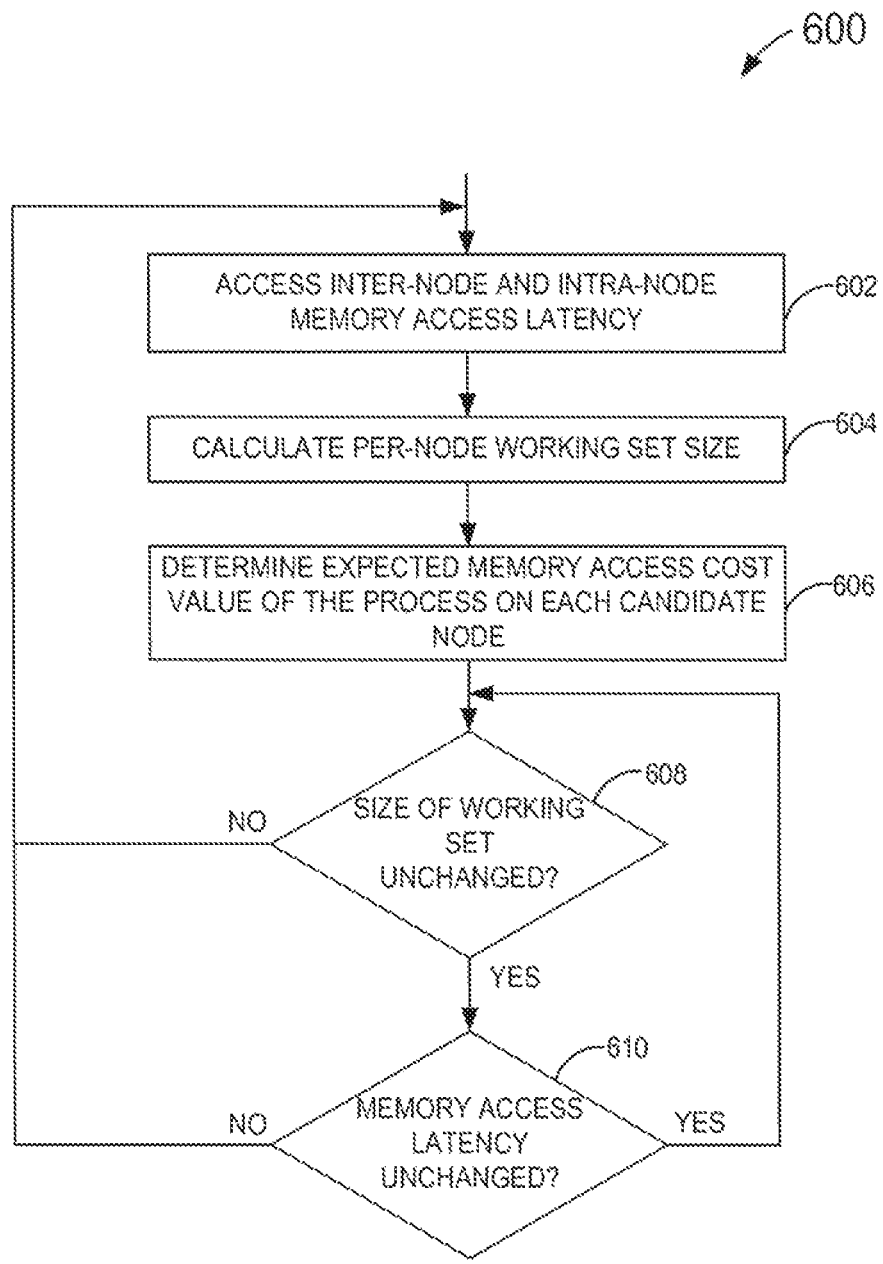
FIG. 6A is a flow chart of an exemplary method performed by a memory cost estimator to determine the expected memory access cost value for various nodes.

FIG. 6A is a flow chart of an exemplary method performed by a memory cost estimator to determine the expected memory access cost value for various nodes. While method 600 is described with reference to execution by a memory cost estimator, it is contemplated that method 600 may be performed by any computing device. The memory cost estimator utilizes the inter-node and intra-node latency, and the per-node working set size to determine the memory access cost value of each NUMA node 304 (e.g., see Equation (2) below). The memory access latency between two NUMA nodes 304 is measured at boot time, for example, by running a tight loop that accesses memory 104 on different NUMA nodes 304. When referring to the memory access latency when a CPU accesses its local memory 104, the term "intra-node memory access latency" is used. When referring to the memory access latency when a CPU accesses memory 104 on a remote NUMA node 304, the term "inter-node memory access latency" is used. In other examples, because the latency may vary depending on the system load, the accuracy of the operations is improved by re-measuring the inter-node and intra-node memory access latency. Alternatively or in addition, either or both of these values may be read from a system locality information table (SLIT).

For optimum results from the present system, the working set size, Wk, where k is the NUMA node 304 being evaluated, of each NUMA node 304 is estimated or calculated, individually. The total working set size, $W_{Total}$, of all of the memory 104 associated with the NUMA client of the vCPU under investigation is also calculated by summing the working set size across all NUMA nodes 304, as shown in Equation (1) below. The working set size is the amount of memory 104 associated with the NUMA client, which may be located on the home NUMA node 304 of the NUMA client, or may be located remotely. vCPUs belonging to the same NUMA client will share the same workingset (occupancy) information. If it is too costly to calculate the working set size for each NUMA node 304, individually, then occupancy, or an amount of memory 104 allocated for the NUMA client which is being evaluated for possible vCPU migration, may be used assuming a uniform memory access pattern. While some examples contemplate the vCPU working set or occupancy being calculated individually per NUMA client 304, other examples contemplate calculating a per-vCPU working set or occupancy.

If the vCPU under investigation has more memory 104 allocated to a given NUMA node 302, it is more likely to access that NUMA node 304. Thus, in some examples, the implementation is based on the occupancy of the NUMA node 304, and not the working set size, in isolation.

$$W_{Total} = \Sigma_k W_k \quad (1)$$

After determining the various working set sizes at 604, and the intra-node and inter-node latency at 602, the memory access cost value, EL(i), where i is the NUMA node being evaluated, is calculated at 606 by the memory cost estimator such as shown in Equation (2) below.

$$EL(i) = \sum_k^\square \left[ \frac{W_k}{W_{Total}} \times L(Proc._i, Mem._k) \right] \quad (2)$$

Figure 6B:
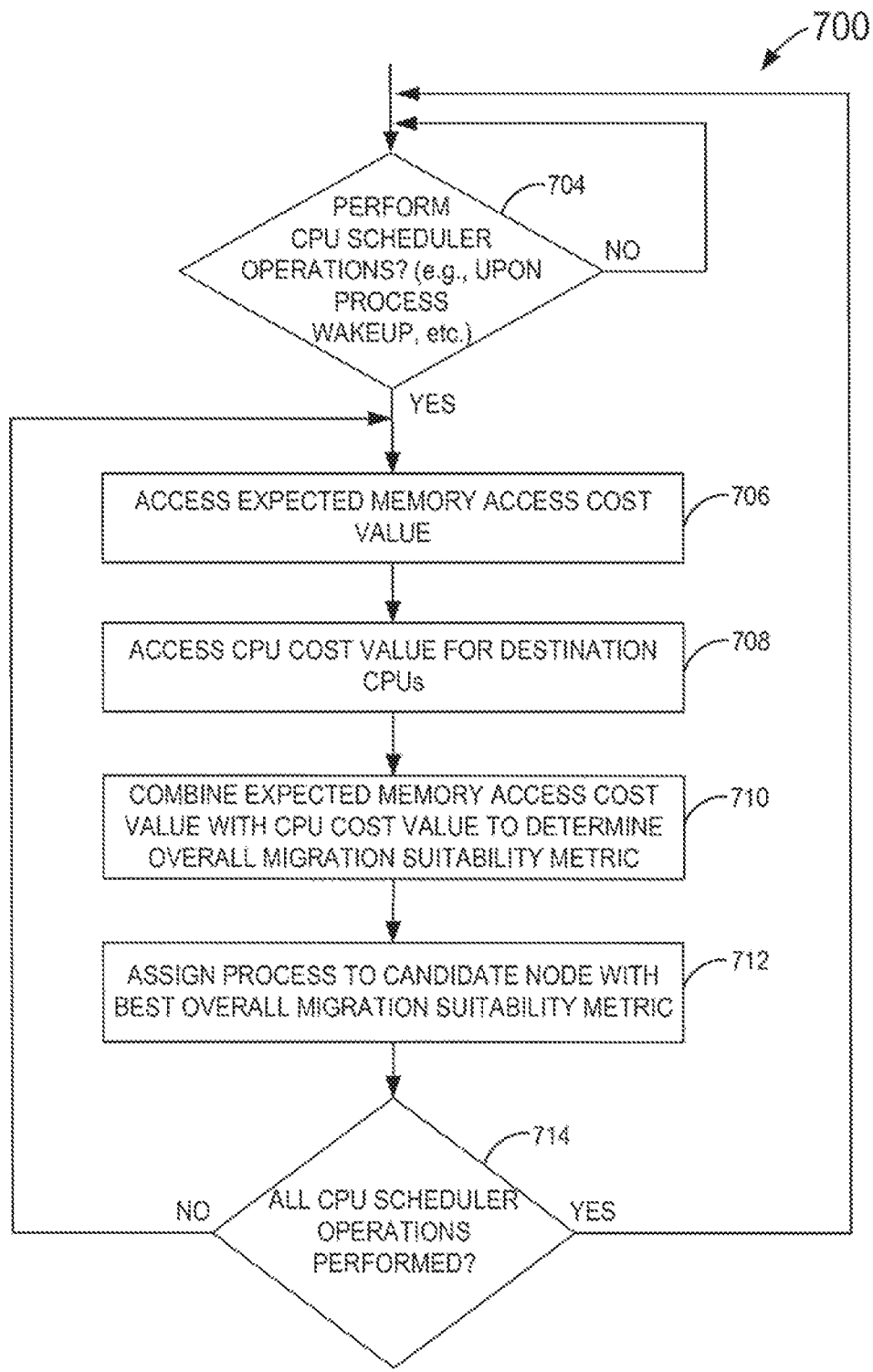
FIG. 6B is a flow chart of an exemplary method performed by a CPU scheduler to evaluate available NUMA nodes for possible migration of a vCPU from its home node to another node.

In the above formula, L(Proc.i, Mem.$_k$) represents the inter-node or intra-node memory access latency. It is calculated between the processor 102, Proc.$_i$, of the NUMA node 304 being examined and its associated memory 104, Mem.$_k$, located on all of the NUMA nodes 304. The formula for memory access cost value sums over all NUMA nodes 304, k, upon which there is some memory 104 associated with the vCPU. Based on that calculation, the CPU scheduler selects the optimal NUMA node 304 for placement of the vCPU, as illustrated in FIG. 6B.

Under the current disclosure, the memory cost estimator evaluates the memory access cost value at 606 of all NUMA nodes 304. The memory cost values are, in some examples, stored in cost tables. The memory cost estimator provides those values to the CPU scheduler, or in other examples the CPU scheduler reads the memory access cost values from the memory access cost tables (illustrated in FIG. 6B at 706). In the illustrated example, NUMA node 2 304 is evaluated as a possible destination for a vCPU currently located on NUMA node 1 304. The memory cost estimator begins with the inter-node and intra-node memory access latencies at 602. Those latencies, as discussed above, may be found by the memory cost estimator, or read from a SLIT.

After the intra- and inter-node memory access latencies have been accessed at 602, the memory cost estimator calculates the total working set size, $W_{Total}$, in units of pages at 604. In another example, the memory cost estimator calculates the working set size first, and the inter- and intra-node memory access latencies subsequently. Other examples anticipate that the inter-node and intra-node memory access latencies are updated to reflect, respectively, interconnection contention and memory bus contention. The total working set size is the total amount of memory 104 associated with the vCPU under review. That memory 104 is located on the home NUMA node 304, or on remote candidate NUMA nodes 304, or on both. If there are "k" NUMA nodes 304 to be evaluated, then initially the CPU scheduler determines the total page occupancy related to the vCPU over all k nodes. In some examples, the memory cost calculation is performed in an off-critical path. The CPU scheduler, in that example, reads the page occupancy from the memory cost table.

In FIG. 3, the pages on the memory 104 are visually represented as squares, each square corresponding, in this example, to 1,000 pages 306 of memory 104. In the example of FIG. 3, there are 2,000 pages 306 on NUMA node 1 304 and 3,000 pages 306 on NUMA node 2 304. In the NUMA system 302 illustrated in FIG. 3, "k" is equal to 2, because there are two NUMA nodes 304. Thus, the $W_{Total}$ for the example of FIG. 3 is 5,000 pages.

After determining the $W_{Total}$ and the inter- and intra-node memory access latencies at 602, the memory cost estimator uses those figures to compute the memory access cost value for each candidate NUMA node 304, at 606. The memory access cost value depends on the memory access latency between the processor 102 of the candidate NUMA node 304 and each NUMA node 304 where the vCPU has memory 104 assigned. In the example of FIG. 3, as discussed above, the CPU scheduler is considering moving a vCPU of VM2 235 onto NUMA node 2 304. For this example, assume the intra-node memory access latency between the processor 102 of NUMA node 1 304 to its associated memory 104 is 100 nanoseconds (nsec), the intra-node memory access latency between the processor 102 of NUMA node 2 304 to its associated memory 104 is 100 nsec, and the inter-node memory access latency between either NUMA node 304 and the memory 104 of the other NUMA node 304 (e.g., the memory 104 of NUMA node 1 304 to the processor 102 of NUMA node 2 304) is 150 nsec.

The memory cost estimator uses those values to calculate memory access cost value at 606 of each NUMA node 304: the EL (NUMA node 1), abbreviated in Equation (3) as $EL(N_1)$, and the EL(NUMA node 2), abbreviated in Equation (3) as $EL(N_2)$. These values are utilized by the CPU scheduler at 710. In this example, the memory cost estimator calculates the following operation in Equation (3).

$$EL(N_1) = \left(\frac{W_{node1}}{W_{Total}} \times L(Proc._{node1}, Mem._{node2})\right) + \quad (3)$$
$$\left(\frac{W_{node2}}{W_{Total}} \times L(Proc._{node1}, Mem._{node2})\right)$$

After the variables are replaced with the quantities determined by the memory cost estimator, the result is shown in Equation (4) below.

$$EL(N_1) = \left(\frac{2,000 \text{ pages}}{5,000 \text{ pages}} \times \times 100 \text{ nsec}\right) + \quad (4)$$
$$\left(\frac{2,000 \text{ pages}}{5,000 \text{ pages}} \times \times 100 \text{ nsec}\right) = 130 \text{ nsec}$$

The memory cost estimator then evaluates placement of the vCPU on NUMA node 2 as shown in Equation (5) below.

$$EL(N_1) = \left(\frac{W_{node1}}{W_{Total}} \times L(Proc._{node2}, Mem._{node1})\right) + \quad (5)$$

-continued
$$\left(\frac{W_{node2}}{W_{Total}} \times L(Proc._{node2}, Mem._{node1})\right) =$$
$$\left(\frac{2,000 \text{ pages}}{5,000 \text{ pages}} \times 100 \text{ nsec}\right) + \left(\frac{3,000 \text{ pages}}{5,000 \text{ pages}} \times 100 \text{ nsec}\right) = 120 \text{ nsec}$$

Thus the expected memory access cost value on NUMA node 2 304, in this example, is less than that on NUMA node 1 304. The memory cost estimator supplies those values to the CPU scheduler, or they may be read by the CPU scheduler from a table at 706.

The operations illustrated in FIG. 6A repeat at 602 if the size of the working set changes at 608 and/or the memory access latencies change (e.g., significantly) at 610. In some examples, the latency (e.g., cycles) is mapped to a range [0, 255].

FIG. 6B is a flow chart of an exemplary method 700 performed by the CPU scheduler to select a destination NUMA node 304 for migration of a NUMA client, or at least one vCPU. While method 700 is described with reference to execution by the CPU scheduler, it is contemplated that method 700 may be performed by any computing device. At 704, the CPU scheduler executes. For example, the CPU scheduler may triggered by process wakeup, by a user 108, or by other events. In some examples, triggering the CPU scheduler is independent of any changes to the memory cost values. In alternative examples, the CPU scheduler monitors the memory cost values to determine whether one of the vCPUs currently scheduled on NUMA node 1 304 should be migrated to another NUMA node 304. As an example of this process, in FIG. 3 the VMs 235 are assigned to their respective NUMA nodes 304 under the traditional hard NUMA policy. VM1 235 and VM2 235 both utilize two of the cores 312 on NUMA node 1 304, resulting in high CPU contention, while two cores 312 of NUMA node 2 304 are underutilized. The present disclosure evaluates all possible NUMA nodes 304 to determine if migrating one or more vCPUs to potentially underutilized cores 312 on other NUMA nodes 304 is preferable. In one example, each vCPU runs the CPU scheduling algorithm to determine which physical CPU is the best place to run the vCPU, considering CPU cost and memory cost. In this example, two vCPUs of VM2 235 find that physical CPUs on NUMA node 2 304 have available capacity outweighing memory cost. Consequently those two vCPUs will move to NUMA node 2 304.

A VM 235 is mapped to one or more NUMA clients, depending on the size of the VM 235. As a result, a VM 235 may have one or more home nodes. Method 700 is triggered by a request for CPU scheduling. The original selection of a home NUMA node 304 is made by the NUMA scheduler, which locates or moves the memory 112 of the VM 235 accordingly. That selection is subsequently evaluated by the CPU scheduler which examines memory distribution and memory access costs to determine whether a vCPU should be migrated from one NUMA node 304 to another. The CPU scheduler makes placement decisions to balance between memory cost and CPU cost. In this manner, the interaction between the NUMA scheduler and the CPU scheduler is indirect via memory distribution.

Aspects of the disclosure are operable with various methods for collecting data for use by the CPU scheduler and its associated estimators. In some examples, the CPU scheduler depends on information received from the memory cost estimator (at 706) and a CPU cost estimator (at 708), such as intra- and inter-node memory access latency, working set size, and CPU load/demand. In some examples, the CPU scheduler reads memory access cost values 706 from a memory access cost table, which the memory cost estimator writes to 606. Alternatively or in addition, the memory cost estimator may provide those values directly to the CPU scheduler.

At 708, the CPU scheduler accesses, from the CPU cost estimator, the current CPU cost value, which depends on CPU load and demand. In some examples, the CPU cost value is pre-calculated by the CPU cost estimator to reduce scheduling latency. The CPU cost value depends, in some examples, on the known topography of the NUMA system 302. In another example, the CPU cost value depends on vCPUs already assigned to the CPUs. Alternatively or in addition, the CPU cost value depends on predicted future needs of VMs 235 already executing, or scheduled to execute. The CPU cost estimator may also incorporate these factors into weighted CPU cost value information, which it supplies to the CPU scheduler. The CPU cost value, in another example, is a function of CPU contention.

At 710, the CPU scheduler combines the memory access cost value and the CPU cost value to determine which NUMA node 304 is the preferred destination for the vCPU. This combined value is referred to as the overall migration suitability metric. The overall migration suitability metric represents the relative value of transferring a vCPU to one NUMA node 304 versus another NUMA node 304. The CPU scheduler selects the NUMA node 304 with the best overall migration suitability, in one example, at 712, and assigns the vCPU to that NUMA node 304. In another example, the memory access cost value and the CPU cost value may be weighted equally in the determination. Alternatively or in addition, the memory access cost value and the CPU cost value are each assigned different weighting factors, based on topography, user defined characteristics, or other input. In another example, the CPU scheduler utilizes an algorithm, which is a function of memory access cost value and CPU cost value, which is weighted depending on the frequency of memory access. The CPU scheduler in this example evaluates the last level cache (LLC) miss rate or miss frequency to approximate the memory access for each NUMA node 304. Alternatively or in addition, the user 108, the VM 235, or the hypervisor 210, for example, may report to the CPU scheduler the anticipated importance of the memory 104 located on each NUMA node 304, based on its observed LLC miss rate.

Alternatively or in addition, the working set size of the more frequently accessed NUMA node 304 is weighted based on a formula supplied by the user 108, a pre-determined policy, or the hypervisor 210, for example. As a further example, the operations may be modified to account for a process that uses memory infrequently, and is more dependent on the CPU cost. In such an example, the remote or local access of the memory 104 is less critical than the CPU contention or CPU capabilities, and the algorithm may be modified to reflect the changed importance. Alternatively or in addition, the CPU scheduler takes into account the topography of the NUMA system 302, and the NUMA nodes 304. In that example, the CPU scheduler considers, for example, the processing speed of one processor 102 versus another. In another example, the algorithms are weighted based on the type of process executed on the vCPU. For example, a VM 235 running with no user interface, running in the background, or executing processes that are not time sensitive, may be placed on a less than optimal processor 102, leaving space for other more critical vCPUs to be placed on under-utilized processors 102. Alternatively or in addition, the CPU scheduler may only apply weight criteria to the algorithms if the intra- and inter-node memory access latencies exceed a threshold value. That value is assigned, for example, by the user 108, or by the hypervisor 210, or according to a stored policy.

In some examples, as the NUMA aware CPU scheduler places vCPUs away from their associated home NUMA node 304, it is possible some vCPUs will run less efficiently (e.g., due to remote memory accesses). This results in unfairness as persistent inefficient execution hurts application performance and user experience. Under aspects of the disclosure, fairness is guaranteed not just at the quantity of CPU cycles but at the quality (e.g., efficiency) of the execution. To compensate for inefficient execution due to remote memory accesses, the shares (e.g., scheduling priority) may be boosted based on sampled memory cost. For example, if a vCPU consistently runs at 20% higher memory cost compared to the other vCPU, the former gets X % more CPU cycles where X is determined based on the proportional difference in the memory cost, by the user 108, and/or in accordance with a stored policy.

At 714, the CPU scheduler evaluates whether there are remaining processes for it to perform. In one example, there could be a buffer or queue of scheduling requests made by users. Otherwise, the CPU scheduler returns to 704 to wait for another triggering event. For example, the CPU scheduler may be triggered by another process beginning or waking up. In other examples, the CPU scheduler responds to changes in topography, changes in processing or memory load, or other factors which effect VM 235 performance and user 108 experience.

Figure 7:
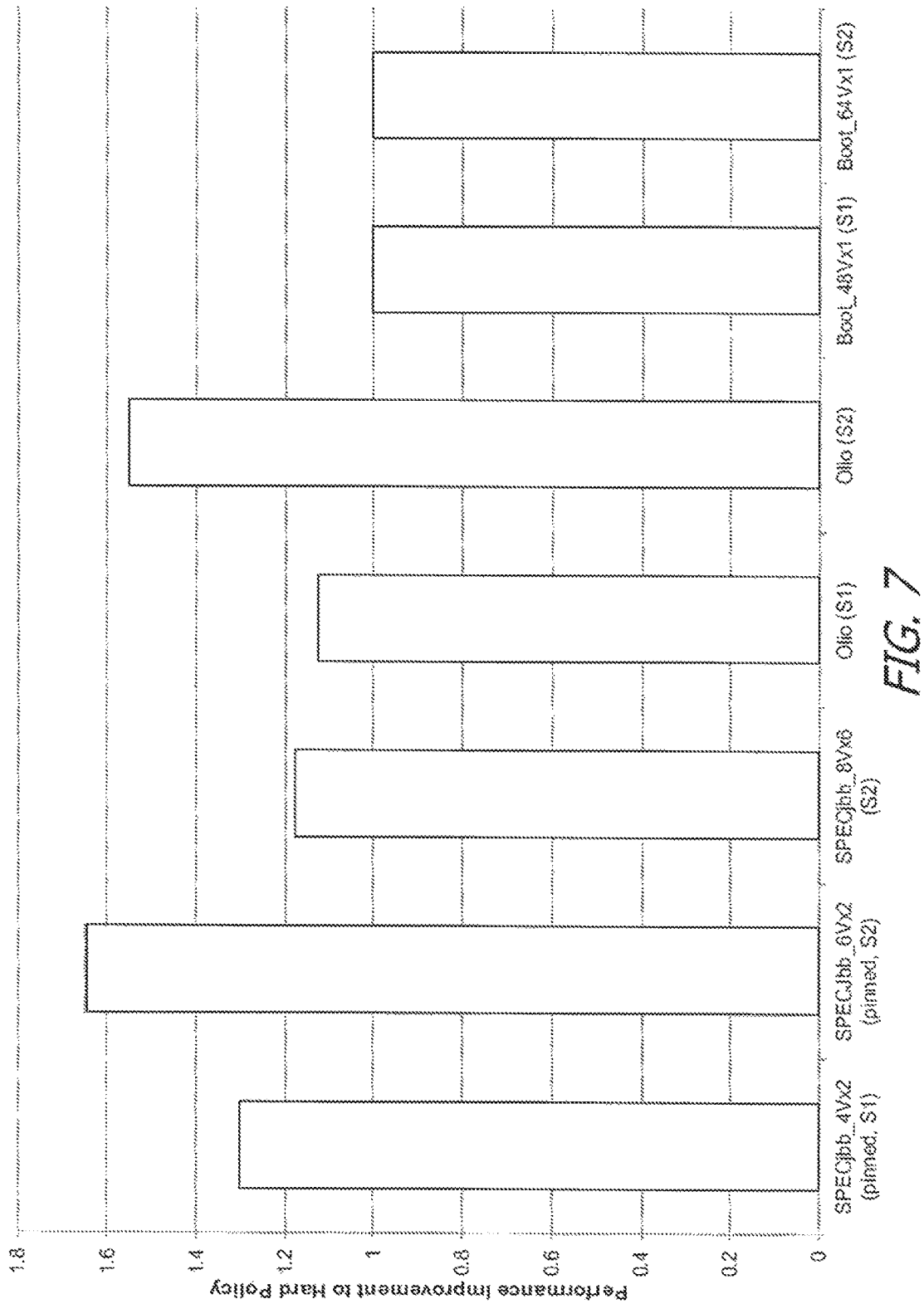
FIG. 7 is a bar graph illustrating the performance benefit of a NUMA aware CPU scheduler compared to an existing hard NUMA scheduler.

FIG. 7 is a bar graph illustrating the performance improvement achieved by NUMA aware CPU scheduling policy. The x-axis represents various workloads and configurations. The y-axis represents relative performance improvement in the throughput or the execution time where value greater than 1 means improvement over existing "hard" NUMA policy. Various workloads and configurations are compared on two systems with different NUMA topology. In this example, the performance of memory intensive workloads improves up to 60% with no performance degradation.

The height of each bar represents the normalized throughput or the execution time where a value greater than 1 means an improvement. Two systems (S1 and S2) are used for the example evaluation where Si has 4 cores per NUMA node and S2 has 6 cores per node. Three workloads, SPECjbb 2005, Olio, and Windows-boot are used under various configurations. When two VMs 235 are pinned to one NUMA node 304 (SPECjbb_4Vx2, SPECjbb_6Vx2), the hard NUMA policy suffers from high CPU contention. With NUMA aware CPU scheduler, vCPUs are scheduled on remote NUMA nodes 304 and utilize available CPU cores 312. The results demonstrate the ability of CPU load balancing under poor initial home NUMA node 304 choice. Although "pinning" induces artificial CPU contention, it does represent short-term CPU contention unexpected to NUMA scheduler. Remaining bars show performance improvements without pinning. Performance improvement ranges from 10% to 50% depending on test configurations.

Additional Examples

Aspects of the disclosure contemplate optimizations for the memory cost estimator and the CPU scheduler. For example, when the CPU scheduler makes a scheduling decision for a process (or a vCPU) and the destination CPU cores are on the same NUMA node, the intra/inter node latency is likely the same, or substantially the same, across those CPU cores. In such a scenario, instead of calculating memory cost for each destination cores (or pCPUs), the CPU scheduler stores (e.g., caches) the memory cost value and reuses it (e.g., merely accesses the computed value). This avoids the overhead of another calculation that will yield the same value.

As another example, when it is expected that the destination CPU cores are limited to one NUMA node (e.g., the CPU scheduler may choose to search CPU cores on current NUMA node), aspects of the disclosure omit calculating the memory cost because it is expected to be equal among all candidate CPU cores. In this case, the CPU scheduler skips calculating memory cost.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

The examples illustrated and described herein as well as examples not specifically described herein but within the scope of aspects of the disclosure constitute exemplary means for mapping virtual processors to physical processors. For example, the elements illustrated in any of FIGS. 1-4, such as when encoded to perform the operations illustrated in any of FIGS. 5-7, constitute exemplary means for determining a memory access cost value for each of a plurality of NUMA nodes, exemplary means for accessing a CPU cost value for a plurality of destination CPUs, and exemplary means for assigning at least one of the destination CPUs to a process based at least on the determined memory access cost value and the accessed CPU cost value.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system for assigning processes in non-uniform memory access (NUMA) systems, the system comprising:
   a computing device;
   a NUMA system implemented within the computing device, the NUMA system comprising a plurality of NUMA nodes, and each NUMA node of the plurality of NUMA nodes comprising a processor and a memory; and
   an application executed by the computing device causing the computing device to at least:
   determine a working set size associated with a process;
   for each NUMA node,
      determine a memory access cost value based on the working set size, an inter-node memory access latency, and an intra-node memory access latency; and
      determine a central processing unit (CPU) cost value for a plurality of destination CPUs;
   determine a migration suitability metric based on the CPU cost value and the memory access cost value for each NUMA node;
   select a particular NUMA node of the plurality of NUMA nodes according to the migration suitability metric; and
   assign the process to a destination CPU of the particular NUMA node.

2. The system of claim 1, wherein the working set size corresponds to a location of memory and an amount of memory associated with the process.

3. The system of claim 2, wherein the location of memory comprises at least two NUMA nodes of the plurality of NUMA nodes.

4. The system of claim 3, wherein determining the migration suitability metric further comprises:
   assigning a first weighting factor to the CPU cost value for each NUMA node; and
   assigning a second weighting factor to the memory access cost value for each NUMA node.

5. The system of claim 4, wherein the first weighting factor is based on at least one of: a frequency of memory accesses by the process, a frequency of a cache miss by the process, a topography, or a user defined characteristic.

6. The system of claim 4, wherein, when executed, the application further causes the computing device to at least periodically update the inter-node memory access latency for each NUMA node.

7. The system of claim 1, wherein determining the CPU cost value comprises accessing the CPU cost value from a memory area of the computing device.

8. A method assigning processes in non-uniform memory access (NUMA) systems, the method comprising:
   determining, in a computing device, a working set size associated with a process;
   for each NUMA node of a plurality of NUMA nodes in a NUMA system,
      determining, in the computing device, a memory access cost value based on the working set size, an inter-node memory access latency, and an intra-node memory access latency; and
      determining, in the computing device, a central processing unit (CPU) cost value for a plurality of destination CPUs;
   determining, in the computing device, a migration suitability metric based on the CPU cost value and the memory access cost value for each NUMA node;
   selecting, by the computing device, a particular NUMA node of the plurality of NUMA nodes according to the migration suitability metric; and
   assigning, by the computing device, the process to a destination CPU of the particular NUMA node.

9. The method of claim 8, wherein the working set size corresponds to a location of memory and an amount of memory associated with the process.

10. The method of claim 9, wherein the location of memory comprises at least two NUMA nodes.

11. The method of claim 8, wherein determining the migration suitability metric further comprises:
    assigning a first weighting factor to the CPU cost value for each NUMA node; and
    assigning a second weighting factor to the memory access cost value for each NUMA node.

12. The method of claim 11, wherein the first weighting factor is based on at least one of: a frequency of memory accesses by the process, a frequency of a cache miss by the process, a topography, or a user defined characteristic.

13. The method of claim 8, further comprising periodically updating the inter-node memory access latency for each NUMA node.

14. The method of claim 8, wherein determining the CPU cost value comprises accessing the CPU cost value from a memory area of the computing device.

15. A non-transitory computer-readable medium comprising a program for assigning processes in non-uniform memory access (NUMA) systems, the program executed in a computing device causing the computing device to at least:
    determine a working set size associated with a process;
    for each NUMA node of a plurality of NUMA nodes in a NUMA system implemented within the computing device,
       determine a memory access cost value based on the working set size, an inter-node memory access latency, and an intra-node memory access latency; and
       determine a central processing unit (CPU) cost value for a plurality of destination CPUs;
    determine a migration suitability metric based on the CPU cost value and the memory access cost value for each NUMA node;
    select a particular NUMA node of the plurality of NUMA nodes according to the migration suitability metric; and
    assign the process to a destination CPU of the particular NUMA node.

16. The non-transitory computer-readable medium of claim 15, wherein the working set size corresponds to a location of memory and an amount of memory associated with the process.

17. The non-transitory computer-readable medium of claim 16, wherein the location of memory comprises at least two NUMA nodes.

18. The non-transitory computer-readable medium of claim 15, wherein determining the migration suitability metric further comprises:
    assigning a first weighting factor to the CPU cost value for each NUMA node; and
    assigning a second weighting factor to the memory access cost value for each NUMA node.

19. The non-transitory computer-readable medium of claim 18, wherein the first weighting factor is based on at least one of: a frequency of memory accesses by the process, a frequency of a cache miss by the process, a topography, or a user defined characteristic.

20. The non-transitory computer-readable medium of claim 15, wherein, when executed, the program further causes the computing device to periodically update the inter-node memory access latency for each NUMA node.

* * * * *